United States Patent
Jaliwala et al.

(10) Patent No.: US 6,879,903 B2
(45) Date of Patent: Apr. 12, 2005

(54) METHOD FOR ESTIMATING FUEL INJECTOR PERFORMANCE

(75) Inventors: Salim A. Jaliwala, Pontiac, IL (US); Michael S. Lukich, Chillicothe, IL (US); Scott R. Schuricht, Edwards, IL (US); Rammohan Sankar, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/734,109

(22) Filed: Dec. 15, 2003

(65) Prior Publication Data

US 2004/0128055 A1 Jul. 1, 2004

Related U.S. Application Data

(63) Continuation-in-part of application No. 10/329,984, filed on Dec. 27, 2002, now Pat. No. 6,801,847.

(51) Int. Cl.[7] .......................... F02M 51/00; G06G 19/00
(52) U.S. Cl. ....................... 701/104; 701/114; 123/478; 123/486; 73/119 A
(58) Field of Search ................................. 701/104, 105, 701/103, 114, 102; 73/119 A; 123/478, 480, 486, 446

(56) References Cited

U.S. PATENT DOCUMENTS

| | | | |
|---|---|---|---|
| 4,200,064 A | 4/1980 | Engele | 123/674 |
| 4,254,653 A | 3/1981 | Casey et al. | 73/1.26 |
| 4,379,332 A | 4/1983 | Busser et al. | 701/105 |
| 4,402,294 A | 9/1983 | McHugh et al. | 123/480 |
| 4,705,000 A | 11/1987 | Matsumura et al. | 123/357 |
| 4,972,293 A | 11/1990 | Verner | 361/187 |
| 5,086,743 A | 2/1992 | Hickey | 123/468 |
| 5,117,790 A | 6/1992 | Clarke et al. | 123/321 |
| 5,131,371 A | 7/1992 | Wahl et al. | 123/436 |
| 5,133,323 A | 7/1992 | Treusch | 123/494 |
| 5,150,690 A | 9/1992 | Carter et al. | 123/527 |
| 5,357,912 A | 10/1994 | Barnes et al. | 123/357 |
| 5,445,128 A | 8/1995 | Letang et al. | 123/436 |
| 5,445,129 A | 8/1995 | Barnes | 123/446 |
| 5,634,448 A | 6/1997 | Shinogle et al. | 123/480 |
| 5,709,192 A | 1/1998 | Zimmermann | 123/436 |
| 5,722,373 A | 3/1998 | Paul et al. | 123/446 |
| 5,758,308 A | 5/1998 | Maki et al. | 701/104 |
| 5,979,403 A | 11/1999 | Brogdon et al. | 123/373 |
| 5,986,871 A | 11/1999 | Forck et al. | 361/160 |
| 6,102,009 A * | 8/2000 | Nishiyama | 701/105 |
| 6,189,378 B1 | 2/2001 | Kendrick et al. | 73/119 A |
| 6,360,161 B1 * | 3/2002 | Francis et al. | 701/115 |
| 6,363,314 B1 * | 3/2002 | Hafner et al. | 701/104 |
| 6,409,094 B2 * | 6/2002 | Tojo et al. | 239/5 |
| 6,549,843 B1 * | 4/2003 | Koerner | 701/104 |
| 6,705,294 B2 * | 3/2004 | Shinogle | 73/119 A |
| 6,801,847 B2 * | 10/2004 | Jaliwala et al. | 701/104 |

FOREIGN PATENT DOCUMENTS

| | | |
|---|---|---|
| EP | 0 467 544 A2 | 1/1992 |
| EP | 0 488 362 A2 | 6/1992 |
| WO | WO 95/31638 | 11/1995 |
| WO | WO 01/34963 A1 | 5/2001 |

* cited by examiner

*Primary Examiner*—Hieu T Vo
(74) *Attorney, Agent, or Firm*—Finnegan, Henderson, Farabow, Garrett & Dunner

(57) ABSTRACT

A method of estimating an injection delay of a fuel injector. A baseline injection delay curve representing an injection delay for a predetermined type of fuel injector is established for a range of rail pressures. At least one test rail pressure for the predetermined type of fuel injector is identified based on the baseline injection delay curve. An injection delay of a selected fuel injector of the predetermined type is measured at the at least one test rail pressure. The injection delay of the selected fuel injector is estimated based on the baseline injection delay curve and the measured injection delay of the selected fuel injector at the identified test rail pressure.

20 Claims, 8 Drawing Sheets

METHOD FOR ESTIMATING FUEL INJECTOR PERFORMANCE

RELATED APPLICATIONS

This application is a continuation-in-part of application Ser. No. 10/329,984 filed on Dec. 27, 2002 for Method for Estimating Fuel Injector Performance.

TECHNICAL FIELD

The present disclosure is directed to a method and system for controlling a fuel injector, and, more particularly, the present disclosure is directed to a method of estimating a performance characteristic of a fuel injector.

BACKGROUND

A fuel injector is commonly used to deliver fuel to a combustion chamber in an internal combustion engine. The fuel injector may deliver a certain quantity of fuel, which may be, for example, diesel, gasoline, or natural gas, to the combustion chambers in the engine at a certain time in the operating cycle of the engine. The amount of fuel delivered to the combustion chamber may depend on the operating conditions of the engine such as, for example, the engine speed and the engine load.

Precisely controlling the quantity and timing of the fuel delivered to each combustion chamber in the engine may lead to an increase in engine efficiency and/or a reduction in the generation of undesirable emissions. To improve control over the quantity and timing of fuel delivery, a typical fuel injection system includes an electronic control module that controls each fuel injector. The electronic control module transmits a control signal to each fuel injector in the engine to deliver a certain quantity of fuel to the combustion chamber at a certain point in the operating cycle.

However, due to manufacturing and/or assembly variations, each individual fuel injector may respond differently to an identical control signal. The different response characteristics of the individual fuel injectors may lead to fuel injectors that receive the same control signal delivering a different quantity of fuel to the combustion chamber. In addition, the different response characteristics of the individual fuel injectors may result in each fuel injector having a different delay period between the application of the control signal and the start of fuel injection.

An engine may experience performance problems if the amount and/or timing of fuel delivered to each combustion chamber diverges from an acceptable tolerance range. For example, the engine may generate an unequal amount of torque when the amount of fuel delivered to one combustion chamber is greater than the amount of fuel delivered to another combustion chamber in the engine. The unequal torque may result in an increased fatigue in engine and/or vehicle components, thereby increasing the amount of maintenance required to keep the vehicle operational.

Several different approaches may be followed to account for the variability in fuel injector operation. For example, the engine may be "over-designed" to compensate for the fuel injector variability. In this approach, the engine is designed with the realization that the engine will experience a decrease in efficiency due to fuel injector variability. The engine is designed such that the theoretical maximum output is greater than the desired output. In operation, the output of the engine will be reduced by the fuel injector variability, but the engine will still generate the desired output.

Alternatively, the manufacturing tolerances for the fuel injectors and fuel injector components may be tightened to reduce the variability between fuel injectors. This tightening of the manufacturing tolerances may reduce the performance variability between fuel injectors. However, the tightening of the manufacturing tolerances will increase the cost associated with manufacturing each fuel injector.

In yet another approach, each fuel injector may be tested to determine the performance characteristics of the particular fuel injector. The fuel injectors may then be grouped into matched sets of fuel injectors that have similar performance characteristics. A matched set of fuel injectors may then be installed on an engine. In this manner, the variability between fuel injectors on an engine may be reduced. However, this approach increases the complexity of the assembly process of the fuel injectors as the injectors must be sorted into many different groups. In addition, this approach increases the complexity of the maintenance process for the engine, particularly when a fuel injector must be replaced or repaired.

In still another approach, the control signal sent to each fuel injector by the electronic control module may be modified to account for the performance characteristics of the particular fuel injector. As described in U.S. Pat. No. 5,634,448 to Shinogle et al., the performance of each fuel injector may be tested in response to a large number of control signals and at number of different operating conditions. Based on this testing, a calibration, or adjustment, parameter may be established for each fuel injector. This adjustment parameter may be used by the engine control module to modify the control signal sent to the fuel injector. Thus, the engine control module may transmit different control signals to each fuel injector to achieve a consistent amount and timing of fuel delivery.

However, the calibration process described in U.S. Pat. No. 5,634,448 requires testing of each fuel injector to determine the appropriate adjustment parameter. In the described process, each fuel injector is tested at a plurality of operating conditions to identify the appropriate performance characteristics. This extensive testing may be a time consuming process that increases the cost of the fuel injectors.

The method and apparatus of the present disclosure solves one or more of the problems set forth above.

SUMMARY OF THE INVENTION

One aspect of the present invention is directed to a method of estimating an injection delay of a fuel injector. A baseline injection delay curve representing an injection delay for a predetermined type of fuel injector is established for a range of rail pressures. At least one test rail pressure for the predetermined type of fuel injector is identified based on the baseline injection delay curve. An injection delay of a selected fuel injector of the predetermined type is measured at the at least one test rail pressure. The injection delay of the selected fuel injector is estimated based on the baseline injection delay curve and the measured injection delay of the selected fuel injector at the identified test rail pressure.

Another aspect of the present invention is directed to a method of identifying a set of test rail pressures for a fuel injector. An actual injection delay is measured for each of a plurality of fuel injectors at a first set of rail pressures. A baseline injection delay curve for the plurality of fuel injectors is determined based on the measured actual injection delays at each of the first set of rail pressures. An injection delay for each of the plurality of fuel injectors is estimated at each of a set of test rail pressures based on a numerical comparison of the baseline injection delay curve and the actual injection delay for each of the plurality of fuel injectors at the set of test rail pressures. An error representing the difference between the estimated injection delay amounts and the actual injection delay amounts for each of the plurality of fuel injectors is determined. The set of test rail pressures is redefined to reduce the determined error.

It is to be understood that both the foregoing general description and the following detailed description are exemplary and explanatory only and are not restrictive of the invention, as claimed.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
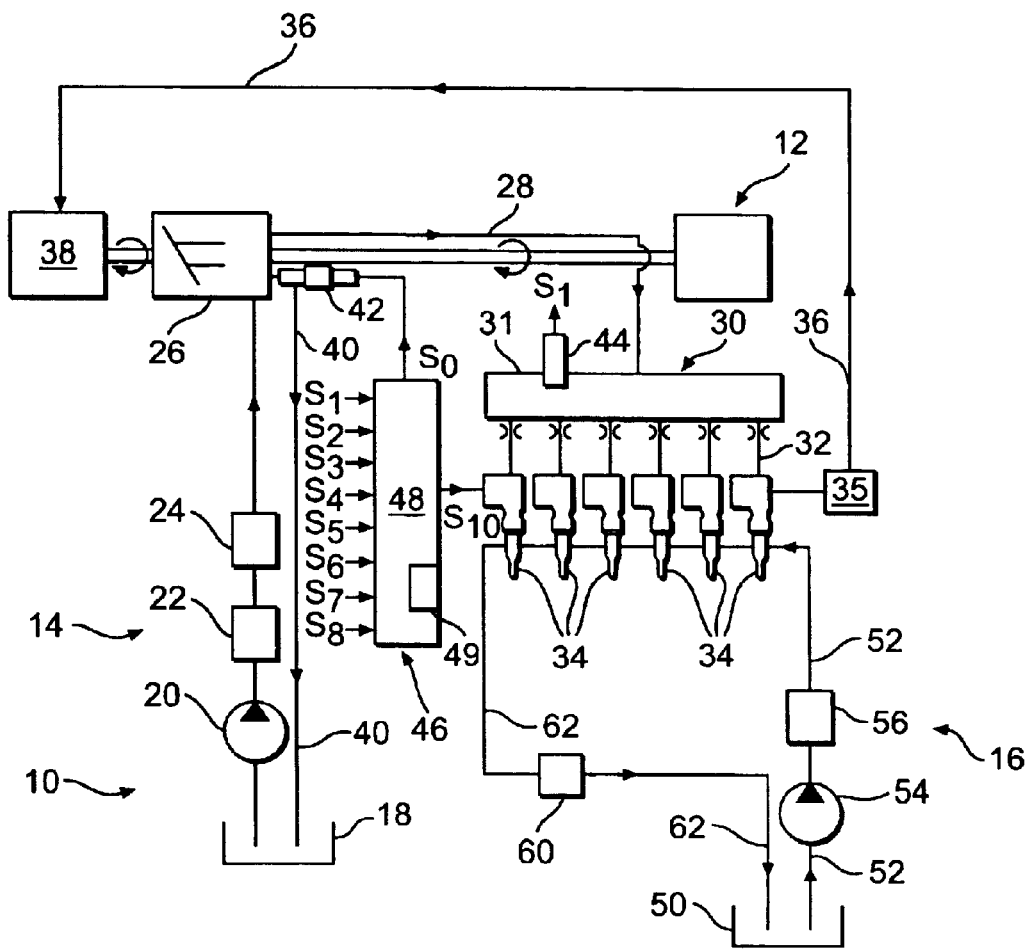
FIG. 1 is a schematic and diagrammatic illustration of a fuel injection control system in accordance with an exemplary embodiment of the present invention.

An exemplary embodiment of a fuel injection control system is illustrated in FIG. 1 and is designated generally by reference number 10. The illustrated fuel injection control system 10 is adapted for a direct injection diesel cycle internal combustion engine 12. It should be understood, however, that fuel injection control system 10 may be used with other types of internal combustion engines, such as, for example, gasoline or natural gas engines.

Fuel injection control system 10 includes an operating fluid supply system 14. Operating fluid supply system 14 includes a tank 18 configured to hold a supply of operating fluid, which may be, for example, hydraulic oil or fuel. A first source of pressurized fluid 20, which may be, for example, a low pressure pump such as an oil sump pump, draws operating fluid from tank 18 and increases the pressure of the operating fluid. First source of pressurized fluid 20 may direct the pressurized operating fluid through a fluid cooler 22 and one or more fluid filters 24.

As also shown in FIG. 1, operating fluid supply system 14 further includes a second source of pressurized fluid 26, which may be, for example, a high pressure hydraulic pump. Second source of pressurized fluid 26 receives the filtered operating fluid and further increases the pressure of the operating fluid. Second source of pressurized fluid 26 directs the pressurized operating fluid into a fluid supply line 28.

As further shown in FIG. 1, fluid supply line 28 connects second source of pressurized fluid 26 with an operating fluid manifold 30. Operating fluid manifold 30 includes a fluid supply rail 31. A pressure sensor 44 may be disposed in fluid supply rail 31. Pressure sensor 44 senses the pressure of the operating fluid in fluid supply rail 31 and generates a signal $S_1$ indicative of the sensed pressure for a given time. Pressure sensor 44 may be any sensor readily apparent to one skilled in the art.

Fluid supply rail 31 provides pressurized operating fluid to a series of branch passageways 32. Each of the series of branch passageways 32 leads to a fuel injector 34. As described in greater detail below, the pressurized operating fluid is used by each fuel injector 34 to inject a quantity of fuel into a combustion chamber of engine 12.

A waste regulating valve 35 (one of which is illustrated in FIG. 1) is in fluid connection with each fuel injector 34. Waste regulating valve 35 controls the return of operating fluid from fuel injectors 34 to a fluid return line 36. Under certain circumstances, the fluid released from each fuel injector 34 may be pressurized.

As also illustrated in FIG. 1, return line 36 may be connected to a hydraulic motor 38. Hydraulic motor 38 may be connected to second source of pressurized fluid 26. Hydraulic motor 38 may use the pressure of the returned hydraulic fluid to generate work, which is applied to second source of pressurized fluid 26 to assist in the pressurization of operating fluid for use in actuating fuel injectors 34.

As illustrated in FIG. 1, a release line 40 may connect second source of pressurized fluid 26 with tank 18. A valve 42 may be disposed in release line 40. Valve 42 regulates the flow of fluid from second source of pressurized fluid 26 to tank 18. Valve 42 may direct some operating fluid to tank 18 to control the pressure of the operating fluid flowing to fluid manifold 30.

As further shown in FIG. 1, a fuel supply system 16 provides fuel to fuel injectors 34. Fuel supply system 16 includes a fuel tank 50 and a fuel pump 54. Fuel pump 54 draws fuel from fuel tank 50 and passes the fuel through one or more fuel filters 56 and into fuel supply line 52. Fuel supply line 52 directs the fuel into fuel injectors 34.

A fuel return line 62 connects fuel injectors 34 with fuel tank 50. Return line 62 provides a passageway for fuel to return from fuel injectors 34 to fuel tank 50. A regulating valve 60 may be disposed in fuel return line 62 to control the flow of fuel from fuel injectors 34 to fuel tank 50.

Figure 2:
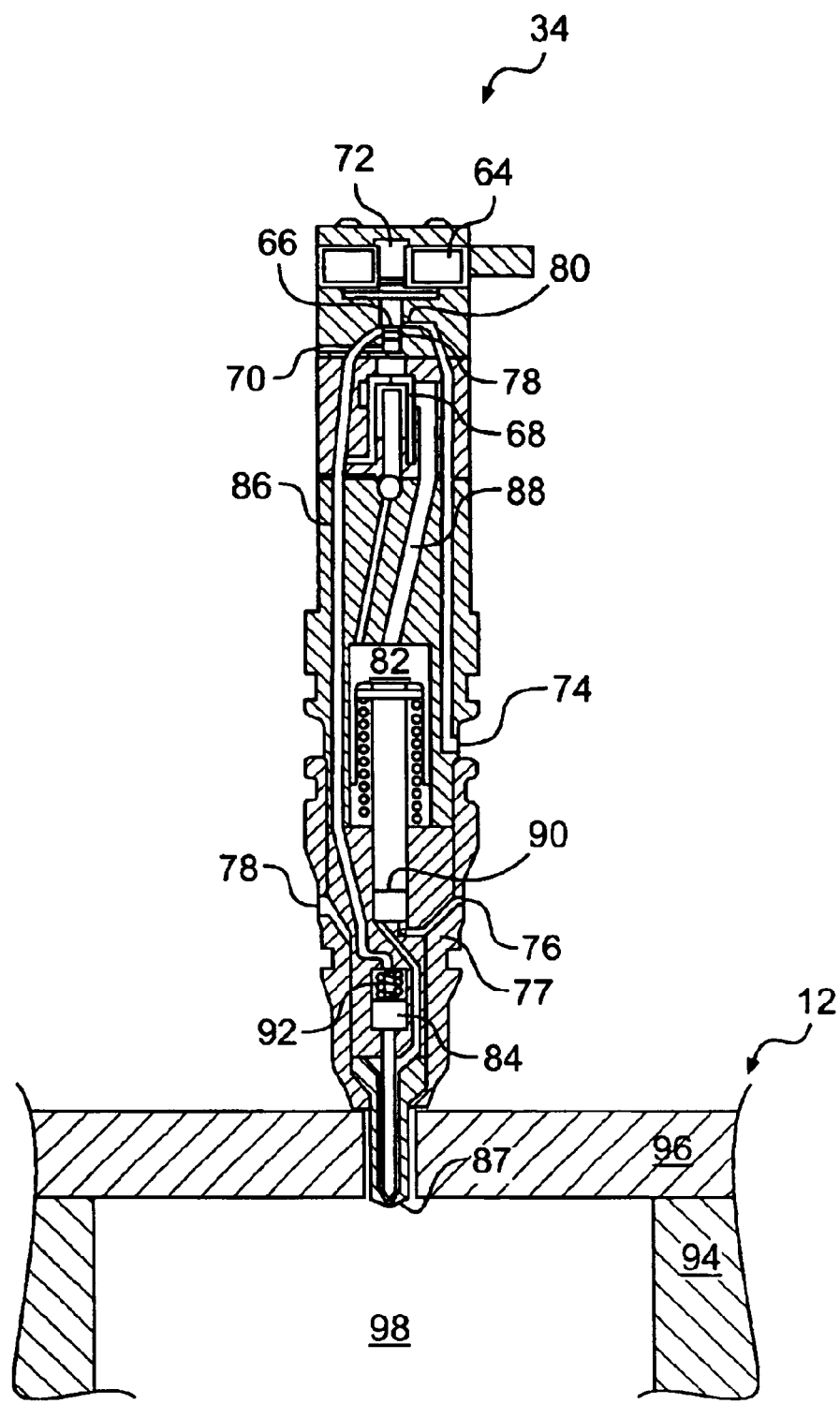
FIG. 2 is a diagrammatic cross-sectional illustration of a fuel injector in accordance with an exemplary embodiment of the present invention.

An exemplary embodiment of a fuel injector 34 is illustrated in FIG. 2. In the illustrated exemplary embodiment, fuel injector 34 is hydraulically-actuated and electronically-controlled. It should be understood that a variety of alternative embodiments of fuel injector 34, such as, for example, electro-mechanical fuel injectors, will be readily apparent to one skilled in the art.

As shown in FIG. 2, fuel injector 34 includes a fuel inlet 76 that is connected with fuel supply line 52 (referring to FIG. 1). Fuel injector 34 includes a fuel passageway 77 that conducts the fuel from fuel inlet 76 to through a chamber 90 to a nozzle 87. Nozzle 86 may extend through a cylinder head 96 of engine 12. Nozzle 87 may be configured to inject fuel into a combustion chamber 98 defined by an engine block 94 of engine 12.

As further shown in FIG. 2, an check valve 84 is disposed in nozzle 87 of fuel injector 34. Check valve 84 may move between a closed position where check valve 84 blocks nozzle 87 and an open position where check valve allows fuel to flow through nozzle 87. A spring 92 may bias check valve 84 into the closed position.

Fuel injector 34 also includes an intensifier piston 82, which is disposed adjacent chamber 90 in fuel passageway 77. In response to a force exerted on the head of the piston, intensifier piston 82 exerts a corresponding force on fuel contained within chamber 90. This force acts to increase the pressure of the fuel between chamber 90 and nozzle 87. The pressure of the fuel exerts a force on check valve 84 that opposes the forces of spring 92 and an operating fluid acting on check valve 84. When the force exerted by the fuel on check valve 84 exceeds the forces of spring 92 and the operating fluid, check valve 84 will move to the open position and allow the pressurized fuel to flow through nozzle 87 and into combustion chamber 98.

Fuel injector 34 also includes fluid inlet 74 that is configured to receive pressurized operating fluid from branch passage 32 of fluid supply rail 31 (referring to FIG. 1). Fuel injector 34 uses the pressurized operating fluid to exert forces on each of the intensifier piston 82 and the check valve 84. Fuel injector 34 includes a first valve 66 and a second valve 68 that control the flow of the pressurized operating fluid through fuel injector 34.

As shown in FIG. 2, fuel injector 34 includes a first passageway 86 that directs the pressurized operating fluid from fluid inlet 74 through first valve 66 to check valve 84. First passageway 86 includes a low pressure seat 78 and a high pressure seat 80. When first valve 66 is engaged with low pressure seat 78, first passageway 86 is connected with fluid inlet 74. When first valve 66 is engaged with high pressure seat 80, first passageway 86 is connected with a fluid drain 70.

First valve 66 may include a solenoid 64 that is configured to move first valve 66 between low pressure seat 78 and high pressure seat 80. A spring 72 may be engaged with first valve 66 to return first valve 66 to low pressure seat 78 when solenoid 64 is de-energized. Thus, energizing solenoid 64 will move first valve 66 to high pressure seat 80 to allow pressurized operating fluid to flow from fluid inlet 74 towards check valve 84. The pressurized operating fluid will exert a closing force on check valve 84. De-energizing solenoid 64 moves first valve 66 to the low pressure seat 78 and allows the pressurized operating fluid to escape from first passageway 86 through fluid drain 70. This will relieve the closing force exerted on check valve 84.

Fuel injector 34 also includes a second passageway 88 that conducts pressurized operating fluid from fluid inlet 74 to intensifier piston 82. Second valve 68 is disposed in second passageway 88 and controls the flow of operating fluid through second passageway 88. Second valve 68 may be, for example, a shuttle valve that is spring biased into a closed position where flow between fluid inlet 74 and second passageway 88 is blocked. In addition, a branch passageway from first passageway 86 may direct pressurized operating fluid from first passageway 86 against second valve 68 to exert an additional closing force on second valve 68.

Second valve 68 may be opened when subject to a pressure differential. As shown in FIG. 2, pressurized fluid from fluid inlet 74 is directed against second valve 68 and exerts an opening force on second valve 68. When solenoid 64 is energized to move first valve 66 to high pressure seat 80, the pressurized operating fluid in first passageway 86 will escape through drain 70, thereby relieving the closing force exerted by the pressurized operating fluid on second valve 68. The resulting opening force exerted on second valve 68 by the pressurized operating fluid from fluid inlet 74 will overcome the spring bias from spring 72 and open second valve 68. When second valve 68 is open, pressurized operating fluid may flow through second passageway 88 to intensifier piston 82. The pressurized operating fluid acts through intensifier piston 82 to increase the pressure of the fuel in chamber 90, which, in turn, exerts a force on check valve 84. When the force of the pressurized fluid acting on check valve 84 exceeds the force of spring 92 and the fluid pressure force, if any, from fluid in first passageway 86, check valve 84 moves to an open position and allows fuel to flow through nozzle 87.

The flow of fuel through nozzle 87 may be stopped by de-energizing solenoid 64 and allowing spring 72 to move first valve 66 to low pressure seat 78. This allows pressurized operating fluid to flow through first passageway 86 to exert a closing force on check valve 84. The closing force of the pressurized operating fluid will overcome the opening force generated by the pressurized fuel and will move check valve 84 to the closed position.

The flow of fuel through nozzle 87 may be restarted by energizing solenoid 64 to move first valve 66 to high pressure seat 80. This allows the pressurized fluid in first passageway 86 to drain, thereby relieving the closing force on check valve 84. Thus, the force of the pressurized fuel will again move check valve 84 to the open position and fuel will flow through nozzle 87 into combustion chamber 98.

As illustrated in FIG. 1, fuel injection system 10 includes a controller 46 that generates a control signal to control the release of fuel from fuel injector 34. Controller 46 may include an electronic control module 48 that has a microprocessor and memory 49. As is known to those skilled in the art, memory 49 is connected to the microprocessor and stores an instruction set and variables. Associated with the microprocessor and part of electronic control module 48 are various other known circuits (not shown) such as, for example, power supply circuitry, signal conditioning circuitry, and solenoid driver circuitry, among others.

Electronic control module 48 may be programmed to control: 1) the fuel injection timing; 2) the total fuel injection quantity during an injection cycle; 3) the fuel injection pressure; 4) the number of separate injections or injection segments during each injection cycle; 5) the time intervals between the injection segments; 6) the fuel quantity of each injection segment during an injection cycle; 7) the operating fluid pressure; 8) the current level of the injection waveform; and/or 9) any combination of the above parameters. Controller 46 may receive a plurality of sensor input signals $S_1$–$S_8$, which correspond to known sensor inputs relating to engine operating conditions. For example, sensor inputs may include, fluid supply rail pressure, engine temperature, engine load, etc. Electronic control module 48 may use these sensor inputs to determine the precise combination of injection parameters to execute a particular injection event.

Electronic control module 48 controls each fuel injection by generating and applying a control signal. One skilled in the art will recognize that the generated control signal will depend upon the type of fuel injector being controlled. For the illustrated exemplary embodiment of fuel injector 34, the generated control signal may be an electrical current that has a predetermined magnitude and duration. The current is applied to solenoid 64 of fuel injector 34, which, as described above, results in the injection of a quantity of fuel into combustion chamber 98.

To account for performance variations between different fuel injectors of the same type, a fuel delivery map may be developed for each different fuel injector 34 and stored in memory 49 of electronic control module 48. These fuel delivery maps provide a relationship between the operating conditions (e.g. rail pressure), control signal characteristics (e.g. current duration), and the fuel delivery amount. Given the operating conditions and the desired fuel delivery amount, electronic control module 48 may access the fuel delivery map to determine the control signal necessary to inject the desired amount of fuel into the respective combustion chamber 98.

Figure 3:
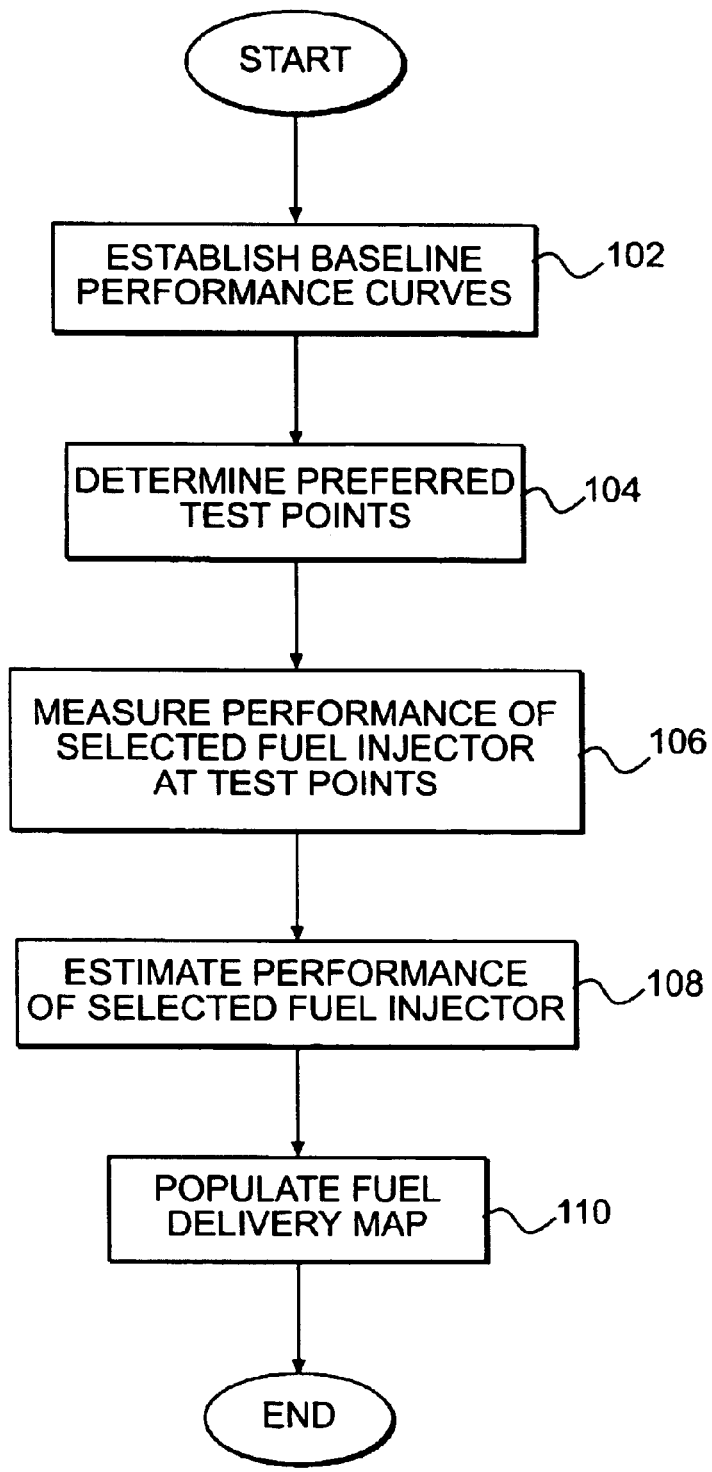
FIG. 3 is a flowchart illustrating a method of generating a fuel delivery map for a fuel injector in accordance with an exemplary embodiment of the present invention.
Figure 4:
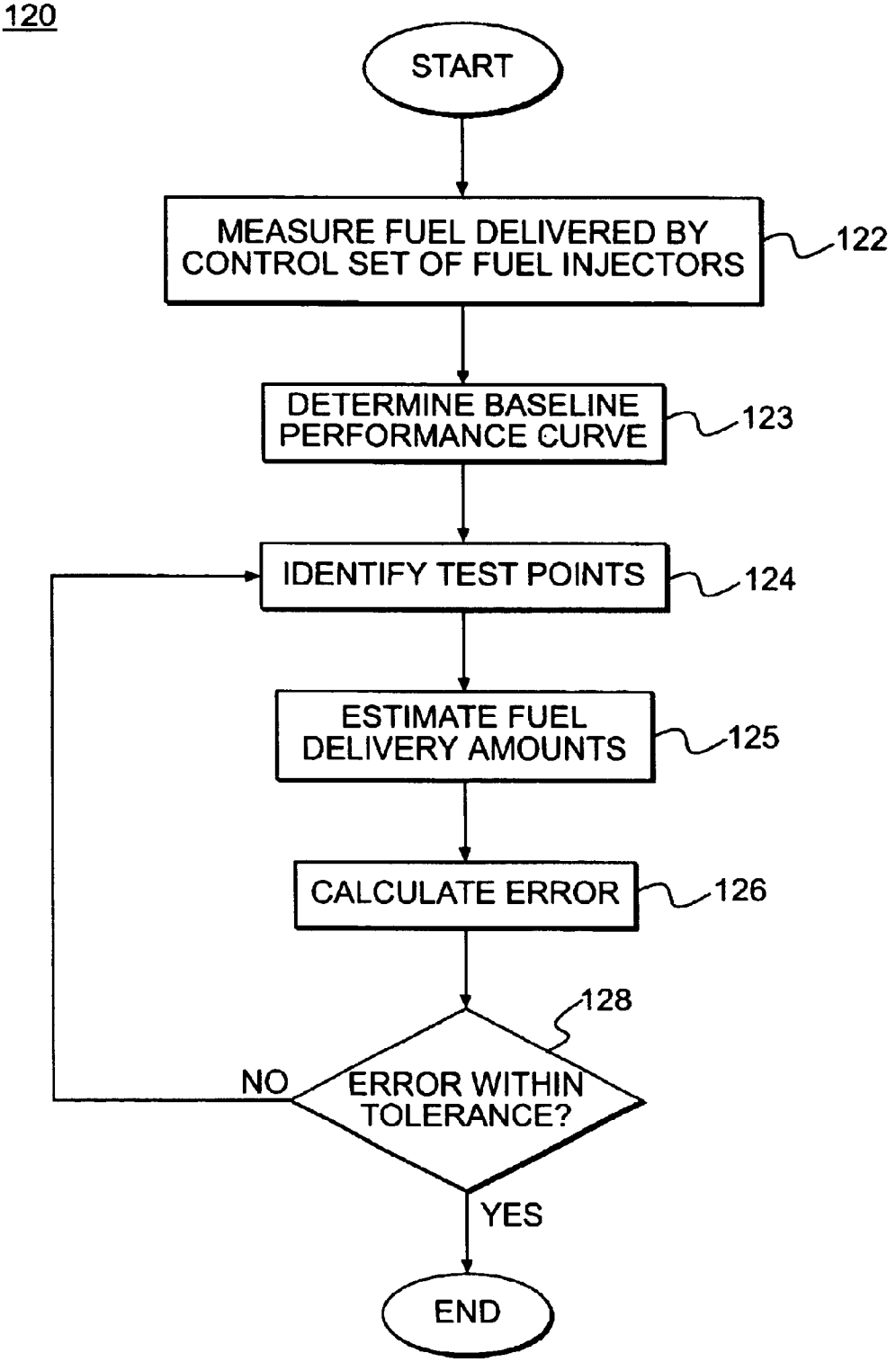
FIG. 4 is a flow chart illustrating a method of identifying a series of preferred fuel delivery test points for a fuel injector in accordance with an exemplary embodiment of the present invention.
Figure 5:
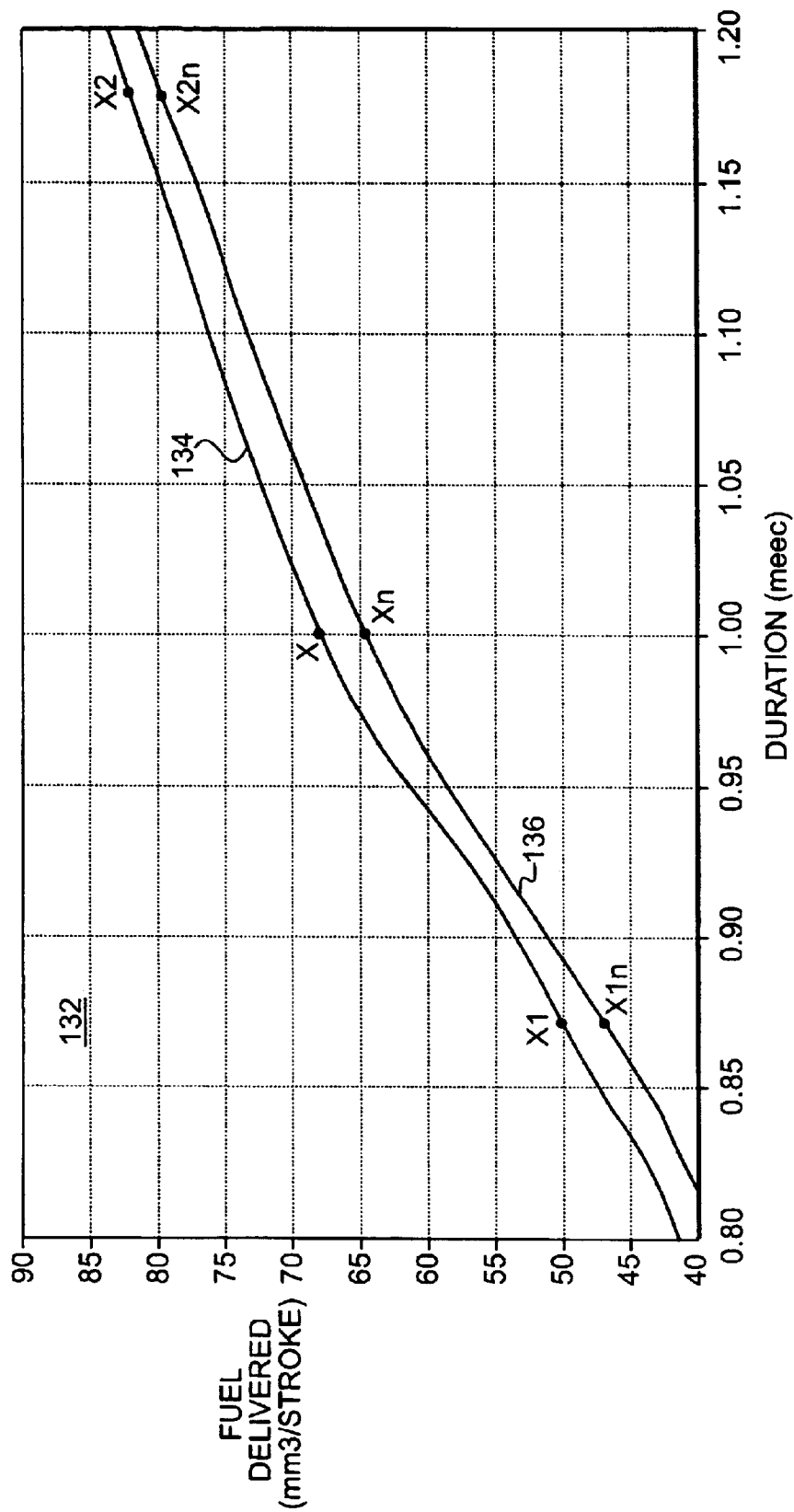
FIG. 5 is a graph illustrating a comparison between an actual performance curve and a baseline performance curve.
Figure 6:
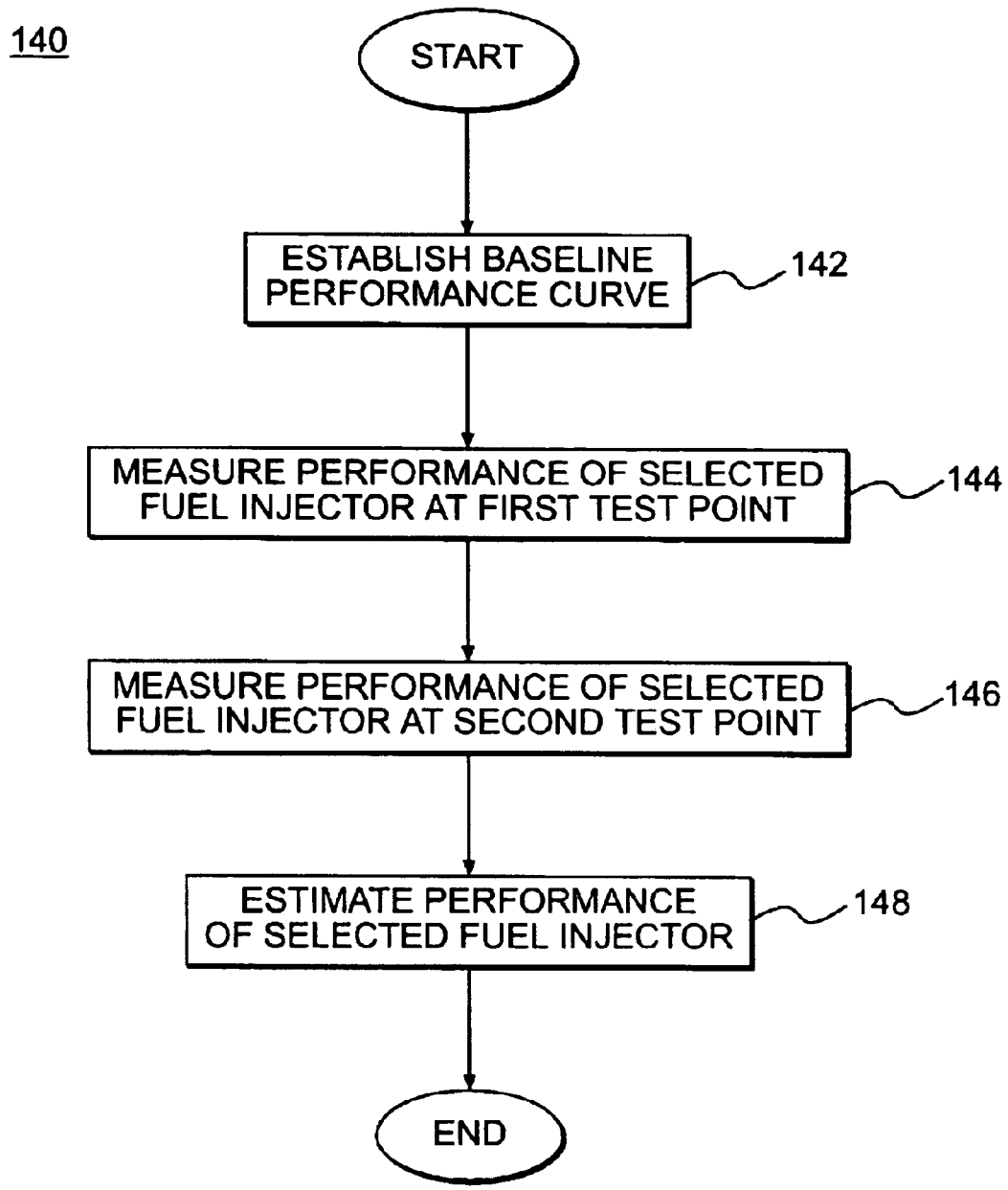
FIG. 6 is a flow chart illustrating a method of estimating the performance of a fuel injector in accordance with an exemplary embodiment of the present invention.

An exemplary method 100 for generating a fuel delivery map for a fuel injector 34 is illustrated in FIG. 3. As shown and as described in greater detail below, the fuel delivery map may be generated by measuring the performance of the selected fuel injector 34 to a test set of control signals. An exemplary method 120 for identifying the preferred number and characteristics of the set of test control signals is illustrated in FIG. 4. The measured performance of the selected fuel injector 34 to the test set of control signals may be compared to a baseline performance of a population of similar fuel injectors 34 of the type of the selected fuel injector 34. FIG. 5 illustrates a graph 132 showing an exemplary comparison of the performance of a selected fuel injector (illustrated by plot 134) to a baseline performance of a population of fuel injectors of the same type (illustrated by plot 136). The fuel delivery map may be populated by estimating the performance of fuel injector 34 for untested control signals. An exemplary method 140 of estimating the performance of the selected fuel injector 34 to untested control signals is illustrated in FIG. 6.

In addition, an injection delay curve may be developed for each different fuel injector 34 and stored in memory 49 of electronic control module 48. The fuel injection delay curve provides a relationship between the pressure of the operating fluid in fluid supply rail 31 and the expected injection delay. For the purposes of the present disclosure, the phrase "injection delay" refers to the amount of time required for the particular fuel injector to start the delivery of fuel as measured from the initiation of a control signal, such as, for example, a current, to the fuel injector. Given the pressure of the fluid in the fluid supply rail 31, electronic control module 48 may access the injection delay curve to determine the timing at which the control signal should be initiated to start injection of the fuel into the respective combustion chamber 98 at the appropriate timing.

Figure 3A:
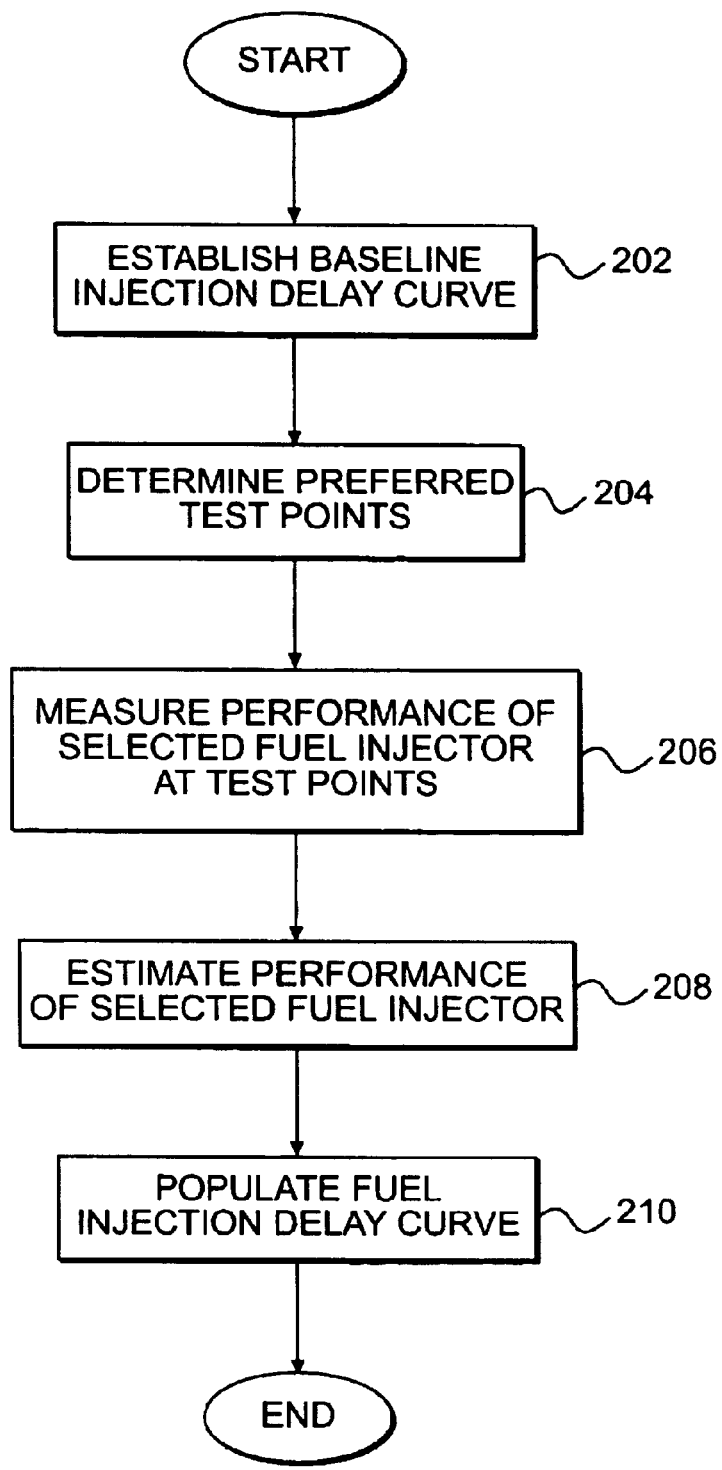
FIG. 3a is a flowchart illustrating a method of generating an injection delay curve for a fuel injector in accordance with an exemplary embodiment of the present invention.
Figure 4A:
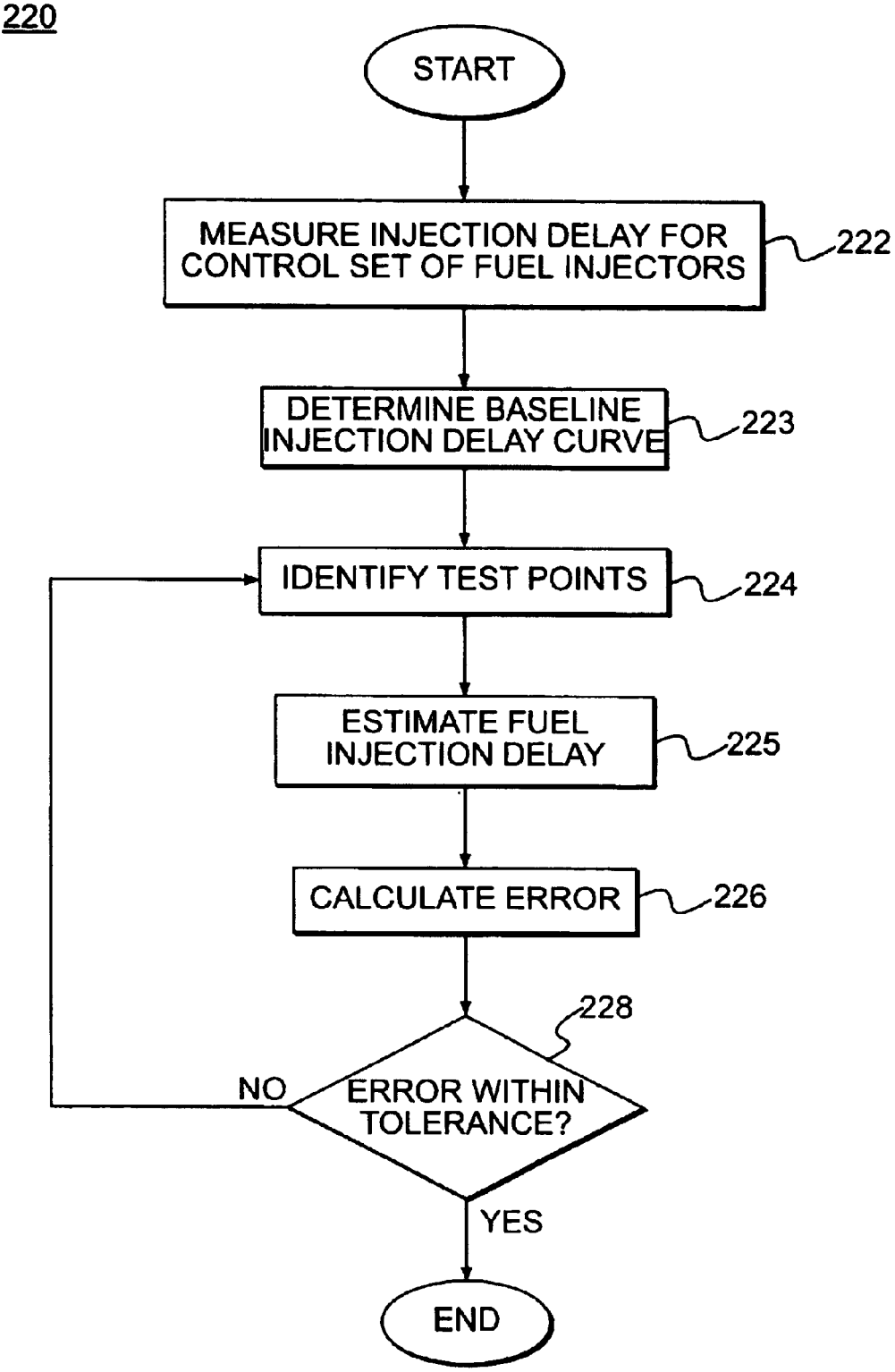
FIG. 4a is a flow chart illustrating a method of identifying a series of preferred rail pressure test points for a fuel injector in accordance with an exemplary embodiment of the present invention.

An exemplary method 200 for generating an injection delay curve for a selected fuel injector 34 is illustrated in FIG. 3a. As shown and as described in greater detail below, the injection delay curve may be generated by measuring the injection delay of the selected fuel injector 34 at a test set of rail pressures. An exemplary method 220 for identifying an exemplary set of preferred test rail pressures is illustrated in FIG. 4a. The measured injection delay of the selected fuel injector 34 at the test set of rail pressures may be compared to a baseline injection delay curve established by a population of similar fuel injectors 34 of the type of the selected fuel injector 34. The injection delay curve for the selected fuel injector 34 may be populated by estimating the injection delay of the selected fuel injector 34 for untested rail pressures. The exemplary method 140 of estimating the performance of the selected fuel injector 34 may be used to estimate the injection delay of the selected fuel injector 34 at the untested rail pressures.

For the purposes of the present disclosure, the fuel injection delay is considered to be a function of the fluid supply rail pressure. It is contemplated, however, that the fuel injection delay may also be dependent upon another property of the fluid in fluid supply rail 31, such as, for example, the fluid temperature. In this circumstance, a series of baseline injection curves may be developed to define the relationship between the fuel injection delay at a series of different rail pressures and fluid temperatures. These curves may be combined into a baseline injection delay map according to the procedures described below in connection with the fuel injector performance. In addition, an injection delay map may also be developed for the selected fuel injector according to the procedures described below in connection with the fuel injector performance.

Industrial Applicability

The method 100 illustrated by the flow chart of FIG. 3 shows an exemplary process of generating a fuel delivery map for a selected fuel injector 34. A series of baseline curves are established for a particular type of fuel injector (step 102). The graph 132 of FIG. 5 illustrates an exemplary baseline performance curve 136.

Each baseline performance curve 136 may define a relationship between a control signal and a performance characteristic of fuel injector 34 for a particular operating condition of the fuel injection system, such as, for example a particular fluid pressure in fluid supply rail 31. Baseline performance curve 136 may, for example, define a relationship between a current duration and a fuel delivery amount for the particular fluid pressure. Baseline performance curve 136 may be determined by measuring the amount of fuel delivered by a large population of fuel injectors 34 in response to a series of control signals having different current durations. The measured fuel delivery amounts for each control signal may then be averaged to define points on baseline performance curve 136. One skilled in the art will recognize that the points on baseline performance curve 136 may be determined though any statistical analysis, such as, for example, a mean value for the measured fuel delivery amounts. The remainder of baseline performance curve 136 may be determined by interpolating or extrapolating between the measured fuel delivery amounts.

A series of baseline performance curves 136 may be developed for the particular type of fuel injector 34. Each of the series of baseline performance curves 136 may define the relationship between a control signal and the performance characteristics for a different operating condition of the fuel injection system. For example, different baseline performance curves 136 may be defined for different operating fluid pressures within fluid rail 31. The series of baseline performance curves 136 may be combined into a three-dimensional fuel delivery map.

A preferred set of test points, or trim points, for the particular type of fuel injector is identified (step 104). Each test point may represent a certain control signal, such as, for example, a certain current duration, at a certain pressure of fluid supply rail 31. It is contemplated that the determined test points may represent a number of different current durations at a number of different rail pressures.

FIG. 4 illustrates an exemplary method 120 of identifying a preferred set of test points. Identifying the preferred set of test points will reduce the amount of testing required to generate the fuel delivery map for the selected fuel injector 34. By reducing the amount of testing required to generate the fuel delivery map, the overall cost of producing fuel injectors 34 can be reduced.

A control set of fuel injectors 34 is selected. For example, the control set of fuel injectors 34 may have between about 15 and 20 fuel injectors 34. Each of these fuel injectors 34 is tested to measure the amount of fuel delivered in response to a first set of control signals (step 122). The first set of control signals may, for example, represent a series of control signals, such as different current durations, that each fuel injector 34 is likely to receive during ordinary operation.

A baseline performance curve 136 for the control set of fuel injectors 34 may be generated based on the measured fuel delivery amounts (step 123). The measured fuel delivery amounts for each different control signal may be averaged and plotted. The remaining points on the baseline performance curve may be interpolated or extrapolated from the measured fuel delivery amounts. Thus, the baseline performance curve may illustrate the average fuel delivery amount of the control set of injectors 34 in response to the first set of control signals.

A second set of control signals representing a possible set of test control signals is selected (step 124). The second set of control signals may be a subset of the first set of control signals. The second set of control signals may be, for example, a series of three current durations that are distributed across the expected range of control signals that may be applied to fuel injector 34 during ordinary operation. One skilled in the art will recognize that a greater, or lesser, number of control signals may be selected for the second set of control signals.

A fuel delivery amount for each fuel injector 34 in the control set is predicted for each of the first set of control signals using the second set of control signals as the test points (step 125). The prediction of the fuel delivery amount may be, for example, based on a numerical model of the baseline performance curve of the control set of fuel injectors 34. A predicted, or estimated, fuel delivery amount may be determined by performing an interpolation or extrapolation based on the actual measured fuel delivery amounts at each of the second set of control points and the numerical model of baseline performance curve 136.

For example, a predicted fuel delivery amount ($Fuel_X$) from fuel injector 34 in response to a selected current duration ($Dur_{Xn}$) may be estimated with equation (1):

$$Fuel_X = (Fuel_{Xn}) \cdot \frac{\left[\frac{Fuel_{X1}}{Fuel_{X1n}}(Dur_{X2} - Dur_{Xn}) + \frac{Fuel_{X2}}{Fuel_{X2n}}(Dur_{Xn} - Dur_{X1})\right]}{\left(\frac{Dur_{X2} - Dur_{Xn}}{Dur_{X2} - Dur_{X1}}\right)} \quad (1)$$

where $Fuel_{Xn}$ is the average fuel amount at the selected current duration ($Dur_{Xn}$); $Dur_{X1}$ is the current duration at the first test control signal; $Dur_{X2}$ is the current duration at the second test control signal; $Fuel_{X1n}$ is the average fuel delivery amount at the first test control signal; $Fuel_{X2n}$ is the average fuel delivery amount at the second test control signal; $Fuel_{X1}$ is the actual fuel delivery amount at the first test control signal; and $Fuel_{X2}$ is the actual fuel delivery amount at the second test control signal. This equation, or another similar equation, may be used to predict the amount of fuel delivered by each fuel injector 34 in the control set of fuel injectors in response to each of the first set of control signals.

The fuel delivery amounts predicted with the above equation may then be compared with the actual fuel delivery amounts for each fuel injector 34 to calculate an error value (step 126). The error value may be calculated by any known statistical analysis method. For example, the error value may be calculated by determining the magnitude of the difference between the predicted fuel delivery amount and the actual fuel delivery amount for each fuel injector 34 in the control set at each of the first series of control signals. Each of these differences may be squared and summed together to generate the total error value for the selected set of test control signals.

The preferred set of test control signals may be obtained by an iterative process where the magnitude and/or number of current durations that constitute the set of test control signals are varied to identify the optimum test points. A new error value may be calculated according to the above described process to determine the error associated with the new set of test control signals. The magnitude and/or duration of the currents of the set of test control signals may be varied until the computed error value is within a predetermined tolerance level (step 128). The predetermined tolerance level for the error value may be selected to ensure that the predicted fuel delivery amounts for each fuel injector 34 are within a certain tolerance limit of the actual fuel delivery amounts for each fuel injector 34. This will ensure that the testing process will yield an accurate fuel delivery map for the selected fuel injector 34.

Referring again to FIG. 3, the next step in generating a fuel delivery map for a selected fuel injector 34 involves measuring a performance characteristic of the selected fuel injector 34 at each or some of the identified test points (step 106). As noted previously, each test point may represent a control signal having a predetermined current duration. The measured performance characteristics may be, for example, an amount of fuel delivered by the selected fuel injector 34 in response to the predetermined current duration.

The measured performance characteristics may be used to generate an actual performance plot 134 (referring to FIG. 5) for the selected fuel injector 34. Referring to the exemplary plot of FIG. 5, a first fuel delivery amount at a first test current is indicated by $X_1$. A second fuel delivery amount at a second test current is indicated by $X_2$.

The remainder of actual performance plot 134 may be completed by estimating the performance of the selected fuel injector 34 (step 108). The performance prediction may be determined by performing an interpolation or extrapolation based on the actual measured fuel delivery amounts at each of the first and second test points and a numerical model of baseline performance curve 136.

The method 140 of FIG. 6 illustrates an exemplary method of estimating the performance of the selected fuel injector 34. The baseline performance curve 136 (referring to FIG. 5) is established for the type of fuel injector 34 (step 142). As noted in connection with step 102 discussed above, baseline performance curve 136 may be generated by testing a large population of a particular type of fuel injector 34.

The performance characteristic of the selected fuel injector 34 is measured at the first and second test points in the set of test control signals (steps 144 and 146). Referring to the exemplary graph of FIG. 5, the first test point is indicated by $X_1$ and the second test point is indicated by $X_2$. As discussed previously, each test point may represent a certain current duration. The predetermined current durations are applied to the selected fuel injector 34, and the amount of fuel delivered by the selected fuel injector 34 is measured. In other embodiments, this procedure may be repeated at additional test points.

The performance characteristic of the selected fuel injector 34 may then be estimated (step 148). The performance may be estimated by performing an extrapolation or interpolation based on the actual performance of the selected fuel injector 34 at the test points and a numeric model of the baseline performance curve 136. For example, the actual amount of fuel delivered ($Fuel_X$) at a predetermined current duration ($Dur_{X_n}$) may be estimated using equation (1) described in connection with step 125 above. This equation, or a similar equation, may be used to populate the actual performance curve 134 for the selected fuel injector 34.

The method 140 of FIG. 6 may be repeated to develop a series of actual performance curves 134 for the selected fuel injector 34. Each of the series of actual performance curves 134 defines the relationship between a fuel delivery amount and a current duration for the selected fuel injector 34 at a number of different operating fluid rail pressures. The series of actual performance curves 134 may be developed for a series of operating fluid rail pressures that are likely to be experienced in the ordinary operation of the fuel injection system.

Referring again to FIG. 3, the fuel delivery map for the selected fuel injector 34 is populated (step 110). The fuel delivery map may be populated by combining the series of actual performance curves 134 into a three-dimensional map that defines the relationship between the fuel delivery amount and the current duration for a range of fluid pressures in fluid rail 31. An interpolation or extrapolation technique consistent with the present disclosure may be used to determine estimated fuel delivery amounts for untested fluid pressures.

A fuel delivery map generated according to the above process may be stored in memory 49 of electronic control module 48 for each fuel injector 34 on engine 12. For the purposes of the present disclosure, the term "map" is intended to include any electronic storage structure for storing information related to the operation of the engine. For example, the map may be a data table, look-up table, graph, or any other electronic storage format readily apparent to one skilled in the art.

During the operation of engine 12, electronic control module 48 may determine an amount of fuel to deliver to each combustion chamber 98 based on the sensed operating conditions of engine 12. Electronic control module 48 may access the fuel delivery map for each fuel injector 34 associated with engine 12 to determine the appropriate control signal to transmit to each fuel injector 34 to obtain the desired fuel delivery amount. Thus, each control signal may be tailored to the particular performance characteristics of the individual fuel injectors 34. In this manner, the performance variations between fuel injectors may be reduced and/or maintained within an acceptable tolerance range.

The method 200 illustrated by the flow chart of FIG. 3a shows an exemplary process of generating an injection delay map for a selected fuel injector 34. A baseline injection delay curve is established for a particular type of fuel injector (step 202). The baseline injection delay curve may define a relationship between the pressure of the fluid in fluid supply rail 31 and the injection delay, i.e. the time required to initiate fuel delivery as measured from the time that the control signal is applied to the fuel injector. The baseline injection delay curve may be determined by measuring the injection delay for a large population of fuel injectors 34 at a series of different rail pressures. The measured injection delay for each rail pressure may then be averaged to define points on the baseline injection delay curve 136. One skilled in the art will recognize that the points on the baseline injection delay curve may be determined though any statistical analysis, such as, for example, a mean value for the measured injection delays. The remainder of the baseline injection delay curve may be determined by interpolating or extrapolating between the measured injection delay points.

A preferred set of test points, or trim points, for the particular type of fuel injector is identified (step 204). Each test point may represent a certain magnitude of fluid pressure within fluid supply rail 31. It is contemplated that the determined test points may represent a number of different rail pressures.

FIG. 4a illustrates an exemplary method 220 of identifying a preferred set of test points. Identifying the preferred set of test points will reduce the amount of testing required to generate the injection delay curve for the selected fuel injector 34. By reducing the amount of testing required to generate the injection delay curve, the overall cost of producing fuel injectors 34 can be reduced.

A control set of fuel injectors 34 is selected. For example, the control set of fuel injectors 34 may have between about 15 and 20 fuel injectors 34. Each of these fuel injectors 34 is tested to measure the injection delay at a first set of rail pressures (step 222). The first set of rail pressures may, for example, represent a series of rail pressures that are expected to be experienced during ordinary operation.

The baseline injection delay curve for the control set of fuel injectors 34 may be generated based on the measured injection delays (step 223). The measured injection delay for each different rail pressure may be averaged and plotted. The remaining points on the baseline injection delay curve may be interpolated or extrapolated from the measured injection delays. Thus, the baseline injection delay curve may represent the average injection delay for the control set of injectors 34 over a range of rail pressures.

A second set of rail pressures representing a possible set of test rail pressures is selected (step 224). The second set of rail pressures may be a subset of the first set of rail pressures. The second set of rail pressures may be, for example, a series of three rail pressures that are distributed across the expected range of rail pressures that may be experienced during ordinary operation of the operating fluid supply system 14. One skilled in the art will recognize that a greater, or lesser, number of rail pressures may be selected for the second set of rail pressures.

An injection delay amount for each fuel injector 34 in the control set is predicted for each of the first set of rail pressures using the second set of rail pressures as the test points (step 225). The prediction of the injection delay may be, for example, based on a numerical model of the baseline injection delay curve for the control set of fuel injectors 34. A predicted, or estimated, injection delay may be determined by performing an interpolation or extrapolation based on the actual measured injection delay at each of the second set of rail pressures and the numerical model of the baseline injection delay curve.

For example, a predicted injection delay ($Del_P$) for a specific fuel injector 34 at a particular rail pressure (p) may be estimated with equation (2):

$$Del_P = (Del_{P_n}) \cdot \frac{\left[\frac{Del_{P_1}}{Del_{P_{1n}}}(P_2 - P_n) + \frac{Del_{P_2}}{Del_{P_{2n}}}(P_n - P_1)\right]}{\left(\frac{P_2 - P_n}{P_2 - P_1}\right)} \quad (2)$$

where $Del_{P_n}$ is the average injection delay at the selected rail pressure (Pn); $P_1$ is the first test rail pressure; $P_2$ is the second test rail pressure; $Del_{P_{1n}}$ is the average injection delay at the first test rail pressure; $Del_{P_{2n}}$ is the average injection delay at the second test rail pressure; $Del_{P_1}$ is the actual injection delay at the first test rail pressure; and $Del_{P_2}$ is the actual injection delay at the second test rail pressure. This equation, or another similar equation, may be used to predict the injection delay for each fuel injector 34 in the control set of fuel injectors at each of the rail pressures in the first set of rail pressures.

The injection delays predicted with the above equation may then be compared with the actual injection delays for each fuel injector 34 to calculate an error value (step 226). The error value may be calculated by any known statistical analysis method. For example, the error value may be calculated by determining the magnitude of the difference between the predicted injection delay and the actual injection delay for each fuel injector 34 in the control set at each of the rail pressures in the first series of rail pressures. Each of these differences may be squared and summed together to generate the total error value for the selected set of test rail pressures.

The preferred set of test rail pressures may be obtained by an iterative process where the magnitude and/or number of rail pressures that constitute the set of test rail pressures are varied to identify the optimum test points. A new error value may be calculated according to the above described process to determine the error associated with the new set of test rail pressures. The set of test rail pressures may be varied until the determined error value is within a predetermined tolerance level (step 228). The predetermined tolerance level for the error value may be selected to ensure that the predicted injection delays for each fuel injector 34 are within a certain tolerance limit of the actual injection delay for each fuel injector 34. This will ensure that the testing process will yield an accurate injection delay curve for the selected fuel injector 34.

Referring again to FIG. 3a, the next step in generating the injection delay curve or map for the selected fuel injector 34 involves measuring the actual injection delay of the selected fuel injector 34 at each or some of the identified test points (step 206). As noted previously, each test point may represent a rail pressure having a predetermined magnitude.

The measured injection delays may be used to generate an actual injection delay plot 134 for the selected fuel injector 34. For example, the measured injection delays may be plotted as a function of rail pressure. Each of the measured injection delays may be plotted to establish the basis for the injection delay curve.

The remainder of the injection delay curve may be completed by estimating the injection delay of the selected fuel injector 34 (step 208). The injection delay prediction may be determined by performing an interpolation or extrapolation based on the actual measured injection delay at each of the first and second test rail pressures and a numerical model of the baseline injection delay curve.

The exemplary method 140 of FIG. 6 may be used to estimate the injection delay of the selected fuel injector 34 at the untested rail pressures. As described previously, the baseline injection delay curve is established for the type of fuel injector 34 (step 142). As noted in connection with step 202 discussed above, the baseline injection delay curve may be generated by testing a large population of a particular type of fuel injector 34.

The injection delay of the selected fuel injector 34 is measured at the first and second test rail pressures in the set of test rail pressures (steps 144 and 146). As discussed previously, each test point may represent a certain rail pressure. The injection delay of the selected fuel injector 34 is measured at each predetermined rail pressure. In other embodiments, this procedure may be repeated at additional test points.

The injection delay of the selected fuel injector 34 at the untested rail pressures may then be estimated (step 148). The injection delay may be estimated by performing an extrapolation or interpolation based on the actual injection delay of the selected fuel injector 34 at the test points and a numeric model of the baseline injection delay curve. For example, the actual injection delay ($Del_P$) at a predetermined rail pressure (P) may be estimated using equation (2) described in connection with step 225 above. This equation, or a similar equation, may be used to populate the injection delay curve for the selected fuel injector 34.

An injection delay curve generated according to the above process may be stored in memory 49 of electronic control module 48 for each fuel injector 34 on engine 12. During the operation of engine 12, electronic control module 48 may determine the appropriate time at which a fuel injection event should be initiated in each combustion chamber 98. Electronic control module 48 may access the injection delay curve for each fuel injector 34 associated with engine 12 to determine the appropriate time at which to initiate the control signal so that each fuel injector 34 initiates fuel delivery at the appropriate timing. Thus, each control signal may be tailored to the particular performance characteristics of the individual fuel injectors 34. In this manner, the performance variations between fuel injectors may be reduced and/or maintained within an acceptable tolerance range.

The disclosed methods allow the performance of a fuel injector to be predicted using a minimal number of test points. This process reduces the cost associated with developing a fuel delivery map and an injection delay curve for a fuel injector and the cost associated with producing a fuel injector. In addition, the disclosed methods may reduce the performance variability between fuel injectors and thereby reduce the amount of maintenance required on the vehicle and/or engine.

It will be apparent to those skilled in the art that various modifications and variations can be made in the disclosed embodiments without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A method of estimating an injection delay of a fuel injector, comprising:

establishing a baseline injection delay curve representing an injection delay for a predetermined type of fuel injector for a range of rail pressures;

identifying at least one test rail pressure for the predetermined type of fuel injector based on the baseline injection delay curve;

measuring an injection delay of a selected fuel injector of the predetermined type at the at least one test rail pressure; and estimating the injection delay of the selected fuel injector based on the baseline injection delay curve and the measured injection delay of the selected fuel injector at the identified test rail pressure.

2. The method of claim 1, further including identifying a preferred set of test rail pressures for the predetermined type of fuel injector based on the baseline injection delay curve.

3. The method of claim 2, further including measuring an actual injection delay for each of a plurality of fuel injectors over the range of rail pressures to establish the baseline injection delay curve.

4. The method of claim 3, further including:
estimating an injection delay for each of the plurality of fuel injectors at each of a set of rail pressures based on a numerical comparison of the baseline injection delay curve and the actual injection delay of each of the plurality of fuel injectors at each of the set of rail pressures;
determining an error representing the difference between the estimated injection delay and the baseline injection delay curve for each of the plurality of fuel injectors; and
reselecting the set of rail pressures to reduce the determined error.

5. The method of claim 4, wherein the set of rail pressures are identified as the preferred set of rail pressures when the determined error is below a predetermined tolerance level.

6. The method of claim 1, wherein the baseline injection delay curve represents an average injection delay for the predetermined type of fuel injector for the range of rail pressures.

7. The method of claim 1, wherein the injection delay is measured as an elapsed time between a start of current applied to the injector and a start of fuel injection in response to the current.

8. The method of claim 1, further including populating an injection delay curve for the selected injector based on the baseline injection delay curve and the measured injection delay of the selected fuel injector at the test rail pressure.

9. A fuel injection control system having an injection delay curve populated according to claim 8.

10. The method of claim 1, further including:
identifying a first injection delay for the selected fuel injector for a first rail pressure and a second injection delay for a second rail pressure; and
estimating the injection delay for the selected fuel injector for a third rail pressure based on a first ratio comparing the first injection delay for the selected fuel injector at the first rail pressure to the baseline injection delay curve for the first rail pressure, a second ratio comparing the second injection delay for the selected fuel injector at the second rail pressure to the baseline injection delay curve for the second rail pressure, and a numerical comparison of the first, second, and third rail pressures.

11. A method of estimating an injection delay for a fuel injector at a particular rail pressure, comprising:
measuring an injection delay for a plurality of fuel injectors of a first type at a plurality of rail pressures;
establishing a baseline injection delay curve for the first type of fuel injector based on the measured injection delay of the plurality of fuel injectors;
measuring a first injection delay for a selected fuel injector of the first type at a first rail pressure and a second injection delay for the selected fuel injector at a second rail pressure; and
estimating a third injection delay for the selected fuel injector for a third rail pressure based on a first ratio comparing the first injection delay for the selected fuel injector at the first rail pressure to the baseline injection delay curve for the first rail pressure, a second ratio comparing the second injection delay for the selected fuel injector at the second rail pressure to the baseline injection delay curve for the second rail pressure, and a numerical comparison of the first, second, and third rail pressures.

12. The method of claim 11, wherein the baseline injection delay curve represents an average injection delay for the first type of fuel injector over a range of rail pressures.

13. The method of claim 11, further including estimating a plurality of injection delays for a plurality of rail pressures.

14. The method of claim 13, further including populating an injection delay curve for the selected fuel injector based on the plurality of estimated injection delays.

15. A fuel injection control system having an injection delay curve populated according to claim 14.

16. A method of identifying a set of test rail pressures for a fuel injector, comprising:
measuring an actual injection delay for each of a plurality of fuel injectors at a first set of rail pressures;
determining a baseline injection delay curve for the plurality of fuel injectors based on the measured actual injection delays at each of the first set of rail pressures;
estimating an injection delay for each of the plurality of fuel injectors at each of a set of test rail pressures based on a numerical comparison of the baseline injection delay curve and the actual injection delay for each of the plurality of fuel injectors at the set of test rail pressures;
determining an error representing the difference between the estimated injection delay amounts and the actual injection delay amounts for each of the plurality of fuel injectors; and
redefining the set of test rail pressures to reduce the determined error.

17. The method of claim 16, wherein the set of test rail pressures is a subset of the first set of rail pressures.

18. The method of claim 16, wherein the set of test rail pressures are redefined until the determined error is below a predetermined tolerance level.

19. The method of claim 16, wherein the estimated injection delay is predicted by at least one of interpolating or extrapolating the estimated injection delay based on a numerical model of the baseline injection delay curve and the actual injection delay for each of the plurality of fuel injectors at the set of test rail pressures.

20. The method of claim 16, further including:
measuring an injection delay of a selected fuel injector at each of the set of test rail pressure; and
generating an injection delay curve for the selected fuel injector based on the measured injection delay at each of the set of test rail pressures.

* * * * *